United States Patent [19]

Rey et al.

[11] Patent Number: 5,173,280

[45] Date of Patent: Dec. 22, 1992

[54] METHOD OF CLARIFYING PHOSPHORIC ACID USING HIGH CHARGE SULFONIC-TYPE POLYMERS

[75] Inventors: Paul A. Rey, Coraopolis; Wood E. Hunter, Pittsburgh, both of Pa.

[73] Assignee: Calgon Corporation, Pittsburgh, Pa.

[21] Appl. No.: 776,101

[22] Filed: Oct. 15, 1921

[51] Int. Cl.$^5$ .................................................. C01B 25/16
[52] U.S. Cl. .................................. 423/321 R; 423/320; 423/321 S
[58] Field of Search .................. 423/321 R, 321 S, 320

[56] References Cited

U.S. PATENT DOCUMENTS

| | | | |
|---|---|---|---|
| 2,266,954 | 12/1941 | Bonnet et al. | 423/321 R |
| 3,664,091 | 4/1972 | Naschke et al. | 423/321 R |
| 4,291,005 | 9/1981 | Poulos et al. | 423/321 R |
| 4,800,071 | 1/1989 | Kaesler et al. | 423/321 R |
| 5,009,873 | 4/1991 | Kerr et al. | 423/320 |
| 5,120,519 | 6/1992 | Gross | 423/320 |

FOREIGN PATENT DOCUMENTS

| | | | |
|---|---|---|---|
| 880214 | 9/1971 | Canada | 423/321 R |
| 1113922 | 5/1968 | United Kingdom | 423/321 R |
| 2047218 | 11/1988 | United Kingdom | 423/321 R |

OTHER PUBLICATIONS

Abstract No. CA96(2):8835d, Abstract No. CA99(26):214925y, Abstract No. CA91:(24):195236r and Abstract No. CA83(22):181589f.

Primary Examiner—Gregory A. Heller
Attorney, Agent, or Firm—W. C. Mitchell; C. M. Caruso

[57] ABSTRACT

A method for clarifying phosphoric acid by flocculation or coagulation of solids wherein an effective amount of a polymer having a predominantly sulfonic functionality is used as the clarification aid. Preferred polymers are high molecular weight acrylamide/acrylamido methylpropyl sulfonic acid-type (AM-/AMPSA) polymers which are predominantly AMPSA.

5 Claims, No Drawings

METHOD OF CLARIFYING PHOSPHORIC ACID USING HIGH CHARGE SULFONIC-TYPE POLYMERS

BACKGROUND OF THE INVENTION

The primary method of manufacturing phosphoric acid is by digestion of phosphate rock with acid. This is commonly referred to as the "wet" process for phosphoric acid production. Apatite (calcium phosphate) is the most commercially valuable phosphate mineral. Sulfuric acid is the most commonly used acid for digestion. A by-product of wet process phosphoric acid production is the generation of a significant amount of calcium and magnesium sulfates (commonly referred to as phosgyp), and to a lesser degree, other precipitates. The insoluble solids are typically removed by filtration, usually on a horizontal pan filter. The solids are then discharged as a waste product and the filtered acid is concentrated by evaporators with a clarification process between each stage. The final acid concentration is determined by the end use and can be as high as 67 to 76% $P_2O_5$, which is known as superphosphoric acid. Fertilizer production accounts for about 90% of phosphate rock utilization.

After the phosphate matrix has been mined, it is beneficiated by washing, screening and/or flotation processes to concentrate the phosphatic material. The concentrated phosphate rock consists of phosphates of calcium, magnesium and the like with some organic as well as inorganic impurities. This material is dissolved by hot (140°-190° C.) sulfuric acid to yield a phosphoric acid solution of about 28% $P_2O_5$. The sulfuric acid reacts with the cations in the phosphatic ore matrix, producing insoluble precipitates. The bulk of the insoluble solids consist of sulfates of calcium and magnesium which are removed by filtration prior to concentration of the acid. Additional solids are generated during concentration of the acid and are removed through sedimentation in clarifiers.

Flocculants are often used to aid the clarification process. See, for example, U.S. Pat. No. 3,644,091, which discloses the use of water soluble sulfonated polystyrenes having molecular weights of from about 1 to about 40 million as phosphoric acid clarification aids.

U.S. Pat. No. 4,800,071 discloses the use of sulfonated acrylamide and sulfonated acrylamide/acrylate polymers to aid in the filtration of gypsum in the "wet" process for production of phosphoric acid.

U.S. Pat. No. 4,291,005 discloses the use of acrylamide/acrylate polymers for settling suspended solids in phosphoric acid product solutions. The polymers disclosed consist essentially of a predominant proportion of acrylic acid units and a minor portion of acrylamide units.

Japanese patent No. JP 56/88814 (CA96(2):8835d) discloses the use of acrylamide/(methacryloyloxy) ethyldimethylbenzelammonium chloride copolymers to flocculate solids from phosphoric acid.

Czechoslovakian Patent No. CS204404 B (CA99(26):214925y) discloses the use of melamine formaldehyde and $PhNH_2$ formaldehyde condensates for clarification of suspended solids in phosphoric acid.

CA86(18):123780 and CA99(12):903x relate to the effect of polyacrylamide on the filtration rate of phosphogypsum.

CA91(24) 195236r discloses the effect of various polyacrylamides and polyethylene oxide polymers on the filterability of phosphogypsum.

By contrast, the present invention relates to the use of sulfonic-type polymers which possess a high anionic charge content as flocculation aids to improve the separation of suspended solids from all grades of phosphoric acid. The term "high anionic charge" refers to the charge density of the polymer in distilled water. It is recognized that a significant portion of the polymer may be protonated at pH levels found in this application. While it is believed that low charge AMPSA/AM-type polymers have been used as phosphoric acid clarification aids, the use of the instant high charge polymers is not disclosed or suggested in the art.

SUMMARY OF THE INVENTION

The instant invention is directed to the clarification of phosphoric acid using sulfonic acid-type polymers. More particularly, this invention is directed to an improved method of clarifying phosphoric acid by flocculation of solids which is characterized by the addition of an effective amount of a high molecular weight acrylamide/acrylamido methylpropyl sulfonic acid (AM/AMPSA)-type polymer flocculant which contains at least 50% AMPSA on a weight basis. The instant invention further relates to the clarification of phosphoric acid produced when phosphate rock is treated with sulfuric acid, filtered and concentrated and the resulting acid is clarified by addition of an effective amount of one of the polymers designated herein.

DETAILED DESCRIPTION OF THE INVENTION

The instant invention is directed to a method for clarifying a phosphoric acid stream, which method comprises adding an effective amount of a high molecular weight, high charge sulfonic acid-type polymer, or a salt thereof, to said phosphoric acid. Compositions comprising a phosphoric acid stream and the instant polymers are also claimed.

The preferred polymers are polymers which comprise acrylamide and sulfonated units and which have a predominantly sulfonated character. These polymers should contain at least about 50 weight percent sulfonate and have a reduced viscosity of at least about 0.5 dl/g as measured at 0.05% active polymer in 1.0 M NaCl. Although a high sulfonate character is preferred from a performance standpoint, it is understood that the sulfonated monomer is more expensive than acrylamide and that it is desirable to keep the content of the sulfonated portion as low as possible within the specified ranges for cost effectiveness. The preferred sulfonated monomer for use in the instant polymers is 2-acrylamido-2-methylpropanesulfonic acid (AMPSA), which is commercially available from Lubrizol Corporation.

More particularly, the sulfonic acid-type polymers of the instant invention comprise a) at least about 50%, by weight of the polymer, of an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid, 3-methacrylamido-2-hydroxy propyl sulfonic acid, sulfonic acid acrylate, their salts and mixtures thereof; and, b) the remainder, up to about 50%, by weight of the polymer, of acrylamide or methacrylamide.

Also, the instant invention is directed to a composition comprising: a) a phosphoric acid stream; and b) about 0.1 to about 500 ppm based on the weight of a), of a high molecular weight, high charge acrylamide/2-acrylamido-2-methylpropyl sulfonic acid-type polymer wherein said polymer comprises, for example, about 99 to about 50%, by weight, 2-acrylamido-2-methylpropyl sulfonic acid and about 1 to about 50% acrylamide, and a method for removing insoluble organic materials from phosphoric acid which comprises adding an effective amount of a high molecular weight, high charge acrylamide/2-acrylamido-2-methylpropyl sulfonic acid-type polymer to said phosphoric acid stream.

Preferably, the sulfonic acid-type polymers of the instant invention comprise: a) about 95% to about 50%, by weight, of a sulfonic acid selected from the group consisting of 2-acrylamido-2-methylpropyl sulfonic acid, 2-methacrylamido-2-methylpropyl sulfonic acid and salts thereof; and, b) about 5 to about 50%, by weight, of acrylamide.

The most preferred polymers are polymers which comprise: a) about 80 to about 60%, by weight, 2-acrylamido-2-methylpropyl sulfonic acid and b) about 20–40%, by weight, acrylamide.

The instant polymers may be prepared by conventional polymerization techniques. Such polymers are available from Calgon Corporation, Pittsburgh, Pa.

The instant polymers should have molecular weights of at least about 500,000, as determined by viscometry. Preferably, the instant flocculant polymers should have molecular weights of at least about 2,000,000, and polymers having molecular weights in excess of 5,000,000 are especially preferred.

An effective amount of the instant polymers should be used. As used herein, the term "effective amount" refers to that dosage of polymer, on an active basis, necessary to give the desired level of clarification in the system being treated.

Preferably the instant clarification aids should be added so as to provide a dosage in the range of from about 0.1 to about 500 ppm, based on active polymer weight and the total weight of the phosphoric acid stream being clarified.

The instant polymers are preferably added to a clarifier feed stream, though any conventional method of adding a flocculant to a clarifier can be utilized, including the use of multiple feed points. In processes which utilize multiple clarifiers, it is preferred to add an effective amount of polymer to each clarifier feed stream. The term "clarifier", as used herein, refers to any clarification device, including, for example, conventional rake clarifiers, Lamella gravity settlers and solid bowl centrifuges.

Phosphoric acid streams of any $P_2O_5$ concentration can be treated. Such streams generally contain from about 0.01 percent to about 20 percent, by weight, solids. Preferably, phosphoric acid streams containing from about 25 to about 75 weight percent $P_2O_5$ are treated.

It is noteworthy that the mineralogy of precipitated solids in a phosphoric acid stream generally varies with acid concentration. Below about 45% $P_2O_5$, the solids precipitated are generally gypsum and fluorosilicates with small amounts of iron and aluminum. Above about 45% $P_2O_5$, iron and aluminum compounds such as iron and aluminum phosphates become more prevalent in the solids. The instant polymers are generally efficacious with respect to the solids present at any acid concentration.

The inventors have found the instant polymers to be especially effective in the removal of insoluble organics from phosphoric acid streams. Such organics are naturally occurring constituents of the phosphate ore matrix.

EXAMPLES

The following examples further demonstrate the instant invention. They are not, however, intended to limit the scope of the invention in any way. In these examples various flocculants were evaluated using a conventional jar test procedure.

EXAMPLES 1–21

Acid clarification jar tests were conducted on 30% and 40% $P_2O_5$ phosphoric acid samples obtained from the clarifier feed lines of a Florida phosphoric acid plant. Results after the designated settling times are shown in Tables I through IV below. Results under the column "Solids Removal" refer to the percentage of solids settled after the allotted time compared to the initial solids in the sample. Table V presents results demonstrating the effectiveness of the high charge AM/AMPSA polymer for organic solids removal vs. conventional acrylamide-based polymer technology. In all tables, AA is acrylic acid, AM is acrylamide and AMPSA is 2-acrylamido-2-methylpropyl sulfonic acid.

As shown in the tables, the high charge AM/AMPSA polymers are significantly better at removing suspended solids than conventional acrylamide-based flocculants.

TABLE I

40% Phosphoric Acid
(2.2% Total Suspended Solids)

| Example Number | Product | MW | Dosage* (mg/L) | % Solids after Settling | Solids Removed % |
|---|---|---|---|---|---|
| 1 | 31/69 AA/AM | 15 MM | 5.0 | 0.7 | 68 |
| 2 | 73/27 AA/AM | 10 MM | 6.6 | 0.8 | 64 |
| 3 | 40/60 AMPSA/AM | 8 MM | 5.3 | 1.1 | 50 |
| 4 | 70/30 AMPSA/AM | 8 MM | 5.3 | 0.4 | 82 |

*"Active Polymer" basis

TABLE II

40% Phosphoric Acid

| Example Number | Composition | MW | Dosage* (mg/L) | % Solids After Settling |
|---|---|---|---|---|
| 5 | 70/30 AMPSA/AM | 8 MM | 2.7 | 0.5 |
| 6 | " | " | 4.0 | 0.5 |
| 7 | " | " | 5.3 | 0.6 |
| 8 | 31/69 AA/AM | 15 MM | 3.8 | 0.9 |
| 9 | " | " | 5.0 | 0.8 |
| 10 | " | " | 7.5 | 0.9 |

*"Active Polymer" basis

TABLE III

30% Phosphoric Acid
(2.1% Total Suspended Solids)

| Example Number | Product | MW | Dosage* (mg/L) | % Solids (5 min) | Solids Removed % |
|---|---|---|---|---|---|
| 11 | Untreated | — | 0.0 | 0.6 | 71 |
| 12 | 63/37 AM/AMPSA | 10 MM | 5.3 | 0.4 | 81 |

TABLE III-continued

30% Phosphoric Acid
(2.1% Total Suspended Solids)

| Example Number | Product | MW | Dosage* (mg/L) | % Solids (5 min) | Solids Removed % |
|---|---|---|---|---|---|
| 13 | 69/31 AM/AA | 15 MM | 3.8 | 0.3 | 86 |
|  | " |  | 5.0 | 0.4 | 81 |
| 14. | 30/70 AM/AMPSA | 8 MM | 4.4 | 0.2 | 90 |
|  | " |  | 5.8 | 0.4 | 81 |

*"Active Polymer" basis

TABLE IV

40% Phosphoric Acid
(2.7% Total Suspended Solids)

| Example Number | Product | MW | Dosage* (mg/L) | % Solids (5 min) | Solids Removed % |
|---|---|---|---|---|---|
| 15 | Untreated | — | 0.0 | 1.4 | 48 |
| 16 | 69/31 AA/AM | 15 MM | 5.0 | 1.2 | 58 |
| 17 | 30/70 AM/AMPSA | 8 MM | 5.4 | 1.2 | 56 |

*"Active Polymer" basis

TABLE V

Removal of Organics
(40% Phosphoric Acid)

| Example Number | Product | MW | Dosage* (mg/L) | Relative** Transmittance (%) |
|---|---|---|---|---|
| 18 | 70/30 AMPSA/AM | 8 MM | 2.7 | 16 |
| 19 | " | " | 4.0 | 38 |
| 20 | " | " | 5.3 | 100 |
| 21 | 27/73 AA/AM | 10 MM | 5.0 | 0.5 |

*"Active Polymer" basis
**The spectrophotometer was set to 650 nm dv transmittance for clarified acid adjusted to 100% Example 21. The transmittance of other tests represent the relative removal of the dark organic materials. The lower the relative transmittance, the poorer the removal of the organics.

What is claimed is:

1. A method for clarifying a phosphoric acid stream which comprises A) adding an effective amount of a high molecular weight, high charge sulfonic acid polymer to said phosphoric acid stream, wherein said polymer comprises: a) at least about 50%, by weight, of an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid, 3-methacrylamido-2-hydroxypropyl sulfonic acid, sulfonic acid acrylate, there salts and mixtures thereof; and b) up to about 50%, by weight of the polymer, of acrylamide or methacrylamide B) removing solids from said phosphoric acid stream.

2. The method of claim 1, wherein said polymer comprises: a) about 50 to about 99%, by weight, 2-acrylamide-2-methyl propyl sulfonic acid and, b) about 50 to about 1%, by weight, acrylamide, and wherein said polymer has a molecular weight of at least about 500,000.

3. The method of claim 2, wherein said polymer comprises: a) about 50 to about 95%, by weight, 2-acrylamide-2-methyl propyl sulfonic acid and, b) about 50 to about 5%, by weight, acrylamide, and wherein said polymer has a molecular weight of at least about 2,000,000.

4. The method of claim 3, wherein said effective amount is from about 0.1 to about 500 ppm, on an active polymer basis, based on the weight of said phosphoric acid stream.

5. A method for removing insoluble organic materials from phosphoric acid which comprises adding an effective amount of a high molecular weight, high charge acrylamide/2-acrylamide-2-methylpropyl sulfonic acid polymer to said phosphoric acid stream and then removing said organic materials from said phosphoric acid stream.

* * * * *